July 6, 1965 J. W. CUMMINGS 3,192,724

REGULATED THERMOELECTRIC COOLING SYSTEM

Filed April 3, 1961 2 Sheets-Sheet 1

INVENTOR:
Jerry W. Cummings
By Willard M. Graham
Agent

REGULATED THERMOELECTRIC COOLING SYSTEM

Filed April 3, 1961 2 Sheets-Sheet 2

INVENTOR:
Jerry W. Cummings
By Willard M. Graham
Agent

United States Patent Office 3,192,724
Patented July 6, 1965

3,192,724
REGULATED THERMOELECTRIC COOLING SYSTEM

Jerry W. Cummings, Redondo Beach, Calif., assignor to Northrop Corporation, Beverly Hills, Calif., a corporation of California Filed Apr. 3, 1961, Ser. No. 100,460
11 Claims (Cl. 62—3)

The present invention relates to thermoelectrics, and more particularly, to a method and means of automatically regulating thermoelectric generating and cooling systems, and especially such a system suited for cooling fluorescent lamps.

Since thermoelectric refrigerators are essentially low voltage and high current devices whose performance is deteriorated by alternating current ripple, they require expensive and complicated power supplies if conventional methods are used. However, since thermoelectric converters or generators are also low voltage and high current devices, with negligible ripple, they are a convenient power source for thermoelectric refrigerators. Adjusting the output of the generator will regulate the cooling effect of the refrigerator.

Accordingly, it is an object of this invention to provide regulation of any system composed of an inter-connected thermoelectric generator and thermoelectric cooler.

A further object of the present invention is to provide an automatically regulated system of thermoelectric generator and cooler.

It has been found that the light intensity output of certain fluorescent lights decreases above a particular temperature of the lamp bulb or envelope. If the lamp temperature were not allowed to rise above this optimum value, a substantial savings of as much as half the number of lamp units necessary for required lighting conditions in hot climates could be achieved.

Therefore, it is yet another object of this invention to provide an economical cooling system adapted for operation in connection with gaseous discharge lamps which will maintain such lamps at a predetermined optimum operating temperature when the ambient temperature is substantially higher.

Other objects and features of advantage will become apparent from the detailed description of a specific embodiment of the present invention to follow.

Briefly as to method, my invention comprises applying heat to the heat rejection side of either the refrigerator or the generator unit. The voltage generated by a generator unit is dependent upon the temperature difference between its hot and cold junctions. In my invention, the generator hot junction is held at essentially a constant temperature by heating means, while the cold junction is cooled by air convection over fins provided for this purpose. Heat is applied to the cold junction fins so that their temperature is raised above ambient by an amount dependent upon the applied heat, which is regulated as required. As the temperature of the cold fins is increased, the voltage output of the thermoelectric generator is decreased, and hence the amount or rate of cooling of the connected thermoelectric cooler is proportionately reduced.

Alternatively, the present method comprises applying a regulated amount of heat to the cold junction fins of the thermoelectric refrigerator, as suggested above. Since the amount of heat pumped by the refrigerator or cooler depends upon the cold fin temperature, the amount of cooling effected is decreased or increased by increasing or decreasing, respectively, the heat applied to the cold fins, which latter operation is subject to control.

Briefly as to apparatus, my invention comprises a thermoelectric generator provided with cooling fins on the cold junction thereof, which fins are subjected to an induced air flow in a chimney-like structure having a thermostatically controlled damper arranged to allow a greater cooling air flow with increasing ambient temperature. At least one thermoelectric cooler is operatively wired to the output of the generator and each cooler has a cold junction installed in contact with the glass tube of a gaseous discharge lamp.

In the accompanying drawings, shown by way of illustration and not limitation,

Figure 1:
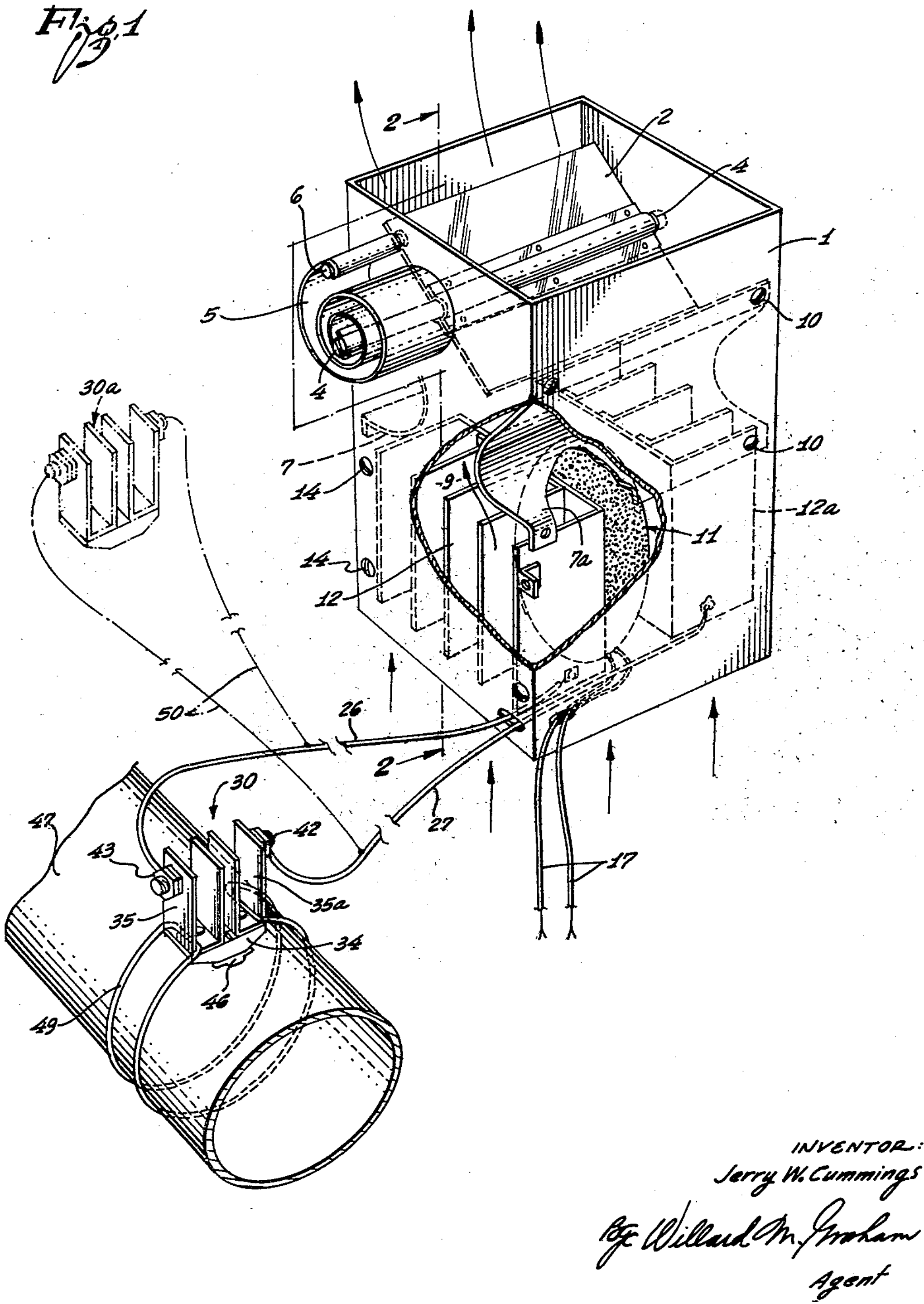
FIGURE 1 is a perspective view of a generator assembly and cooler connected together and to a fluorescent lamp, illustrating the overall system of the present invention.

Referring first to FIGURE 1 for a detailed description of specific apparatus, a rectangular open-end chimney 1 carriers in its upper portion a rotatable damper 2 capable of substantially closing the chimney 1. Damper 2 is mounted on a shaft 4 which extends outside the chimney 1 and has one end of a bimetal thermostatic spring 5 fastened thereto. The other end of bimetal spring 5 is attached to a fixed pin 6 which in turn is secured to the chimney 1. The spring 5 and damper 2 are arranged as is well known in the art, in the proper direction to cause closing movement of the damper 2 when ambient temperature to which the spring 5 is exposed decreases, and vice versa.

Figure 2:
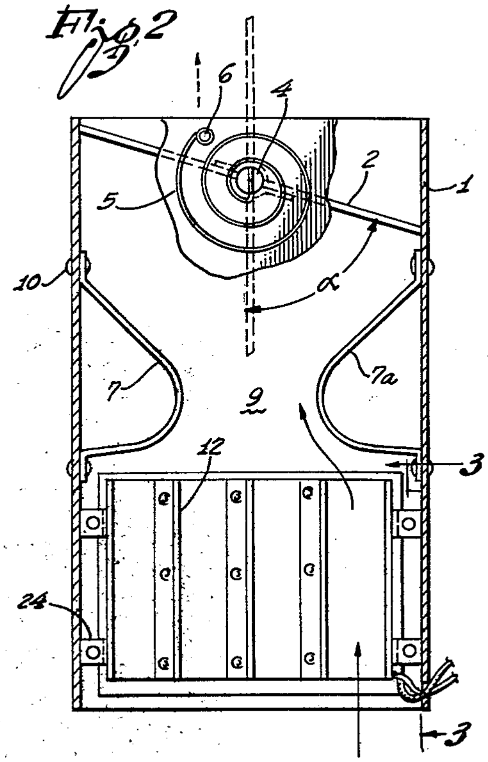
FIGURE 2 is a longitudinal section, partly cut-away, of the generator and chimney assembly taken as indicated by the line 2—2 in FIGURE 1, showing the internal components in the chimney.

Below the damper 2 is a pair of throat inserts 7 and 7*a* defining a venturi passage 9 which induces upward flow of warm air through the chimney 1. These inserts are attached to the chimney 1 by any suitable means, such as by insert screws 10 as further shown in FIGURE 2.

Below the inserts 7 and 7*a* is a thermoelectric generator 11 having generator cooling fins 12 and 12*a*, this entire assembly being electrically insulated from the chimney 1 as will be described later, and attached to the walls of the chimney 1 by fin screws 14. The fins are preferably copper.

Figure 3:
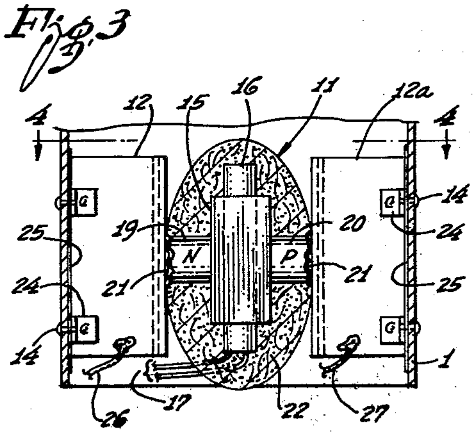
FIGURE 3 is a partial longitudinal section of the chimney assembly taken as indicated by the line 3—3 in FIGURE 2, showing details of the generator construction.
Figure 4:
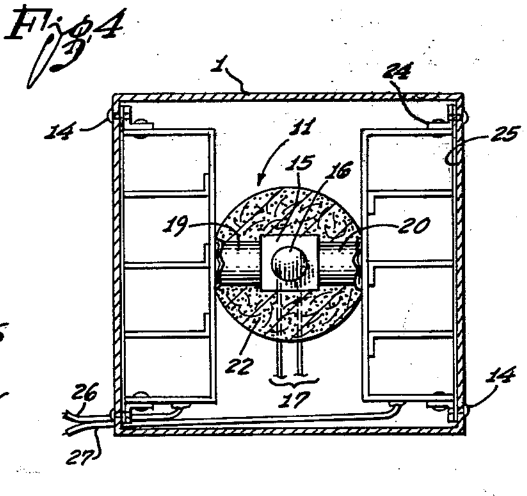
FIGURE 4 is a cross section of the chimney assembly taken as indicated by the line 4—4 in FIGURE 3, showing details of the generator as viewed from the top.

Reference is now made particularly to FIGURES 3 and 4 for a description of the generator 11. An iron block 15 contains in heat conducting relation a conventional type of electrical heating element 16, having input leads 17 for connection to a suitable power source such as 115 volts A.C. for example. Two thermoelectric material ingots 19 and 20, one negative type and one positive type as is well known in the art, are fixed respectively to opposite sides of the iron block 15. They are bonded thereto in heat and electrical conducting relation by any suitable method, preferably including soldering for example. The outer ends of the ingots 19 and 20, which may be cylindrical in shape, are secured in good thermal and electrical contact, such as by solder 21, with the respective opposed generator cooling fins 12 and 12*a*.

The internal generator assembly is preferably enclosed in a heat insulating plastic foam 22, such as a silicone or ceramic foam for example, so that the generated heat flows substantially only from the iron block 15 through the thermoelectric ingots 19 and 20 to the fins 12 and 12*a*. The fins 12 and 12*a* are provided with riveted plastic clips 24, for example, and an electrical insulator 25 is placed between each fin and the wall of the chimney 1, the fin screws 14 passing through the insulator 25 and the clips 24. Fins 12 and 12*a*, besides serving to keep the outside of ingots 19 and 20 cold, also have output leads 26 and 27 from the generator attached respectively thereto. Thus, the voltage developed by the generator 11 has a current path through the output leads 26 and 27, generator fins 12 and 12*a*, ingots 19 and 20, and iron block 15. The inner ends of ingots 19 and 20 form the hot junction, while the outer, finned ends form the cold junction.

Figure 5:
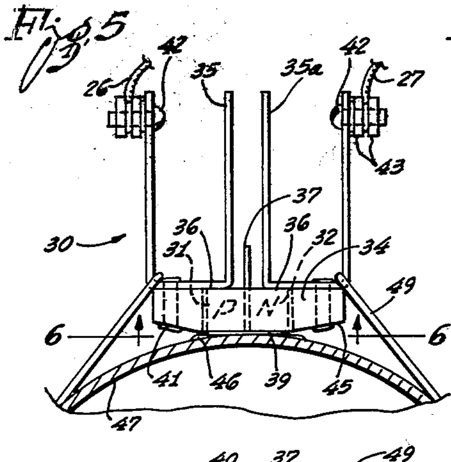
FIGURE 5 is an elevation view of the cooler showing also its attachment to the fluorescent lamp tube.
Figure 6:
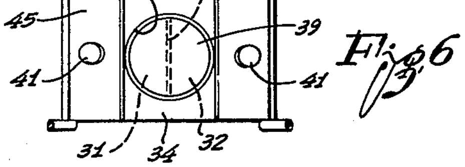
FIGURE 6 is a bottom view of the cooler viewed as indicated by the line 6—6 in FIGURE 5.

Attention is now directed to FIGURES 5 and 6 in conjunction with FIGURE 1. Here, a thermoelectric cooler 30 comprises a pair of thermoelectric semiconductors 31 and 32 similar to the generator ingots 19 and 20, a plastic support 34, and a pair of separated cooler fins 35 and 35*a*. The fins are preferably copper. The semiconductors 31 and 32 are respectively soldered to the cooler fins 35 and 35*a* at a hot junction 36, and are preferably semicylindrical in this embodiment as shown. They are electrically insulated along their flat inner faces by a mica strip 37 for example. At their outer ends (the cold junction), a cold shoe 39 is provided by a bridging piece of metal soldered across the semiconductor ends.

Since the thermoelectric soldered joints at the hot junction 36 tend to be mechanically weak, the plastic support 34, which has an opening 40 therein, surrounds the semiconductors 31 and 32 for protection and is secured to the cooler fins 35 and 35*a* by rivets 41 to strengthen the assembly. Thus, the support 34 guards against bending moments which might cause the soldered joints to fail, and also insulates against the influx of heat into the elements except through the cold shoe 39.

The cooler fins 35 and 35*a* are used as the electrical inputs by providing terminal screws 42 therein, and nuts 43 to connect to the generator output leads 26 and 27 respectively. To maintain the cold shoe 39 as the outermost part of the cooler 30, the plastic support 34 has beveled bottom surfaces 45.

For application of the cooler 30 to a fluorescent lamp, a simple arrangement as shown in FIGURES 1 and 5 is preferred. A small quantity of heat-conducting grease 46 is preferably applied to the cold shoe 39, and then the latter is placed in contact with the glass wall 47 of a fluorescent lamp whose maximum temperature is desired to be limited. Heat-conducting cement could be used in place of the grease, if desired, the purpose being to maintain the lowest possible temperature drop between the cold shoe 39 and the lamp wall 47. An elastic band 49, such as a silicone rubber band, is passed around the lamp wall 47 and looped over the respective cooler fins 35 and 35*a*, to hold the cooler in place. Thus, the cooler 30 is easily and quickly installed or removed from a lamp.

By removing heat from a small spot on the lamp wall, a small amount of the internal material which contributes to the vapor pressure is condensed, thus decreasing the vapor pressure and enabling the maintaining of a constant optimum light output over a large temperature range. This is because the factor which causes light reduction in such a tube with increasing temperature is due to an increasing internal vapor pressure.

In operation, the slightly elevated temperature of the generator fins 12 and 12*a* over the ambient temperature causes a rising of air to be developed in the chimney 1. When the proper electrical connection is made between the generator 11 and the cooler 30, the amount of cooling of the lamp wall 47 is regulated by the position of the damper 2. As it is desired to produce an amount of cooling dependent upon the ambient temperature, the bimetal spring 5 senses the ambient temperature and positions the damper 2 accordingly. At the highest temperature of interest, the damper 2 is open to cause a maximum amount of heat to be pumped by the cooler 30. At lower ambient temperatures, the damper 2 rotates toward its closed position, thus effectively adding heat to the cold junction of the generator 11 to lower the generator output and decrease the amount of heat pumped. Although the present device functions to regulate the amount of heat added to the cold junction of the generator, the invention also is deemed to encompass the method comprising adding heat to the cold junction of the cooler, since it is obvious from the present teaching that the desired regulation of a system of a generator and cooler can be obtained in either way.

Thus it is seen that a simple and economical means and method of automatically regulating a thermoelectric cooling system has been provided. In the present embodiment, two or more coolers can be connected to and operated by a single generator, as shown by a second cooler 30*a* with supply wires 50 connected in parallel with generator output leads 26 and 27. The generator may be located out of sight and the wires for the coolers passed through the lamp fixtures along with the regular lighting supply conductors. By using the venturi principle in the chimney, a relatively large air flow rate can be achieved with a short chimney, approximately eight inches for example. Adjustments to make the present system regulate to a particular given optimum temperature are easily performed by conventional methods, i.e., adjusting the relative positions of the damper 2 and bimetal spring 5, and selecting a bimetal spring rate of the required value for a given job in accordance with generator characteristics and the like.

I claim:

1. The method of regulating a system having a thermoelectric generator assembly connected as the power source of a thermoelectric cooler assembly, comprising: holding the hot junction of the generator assembly at any esentially constant elevated temperature, applying heat to the heat rejection side of one of said assemblies, and controlling the amount of said applied heat in response to a desired performance of said system.

2. A regulated cooling system comprising a thermoelectric generator having a hot junction and a cold junction with a heat conducting fin attached ot the latter, a heating element in fixed heat transmitting relation to said hot junction, a chimney surrounding said generator, a damper in said chimney, a thermostatic control element connected to said damper in the sense to open said damper with increased control element temperature, and a thermoelectric cooler operatively connected to the output of said generator.

3. Apparatus in accordance with claim 2 wherein said heating element is electrically operated at a constant heat output, said control element being responsive to ambient temperature around said system.

4. Apparatus in accordance with claim 2 including means defining a venturi-like passage in said chimney.

5. Apparatus in accordance with claim 2 wherein a plurality of said coolers are each remotely connected in parallel to the output of said generator.

6. A thermoelectric generator assembly comprising a block of thermal and electrical conductive material, a heater within said block, a pair of opposite thermoelectric type ingots bonded one on each respective side of said block, a thermal and electrical conductive fin bonded to the outer end of each of said ingots, an encapsulating enclosure of heat insulating material surrounding said ingots, block, and heater, and an electrical output connection on each of said fins.

7. A controllable thermoelectric generator assembly comprising a thermoelectric generator having a central hot junction and opposed electrically separated outer ends constituting spaced parts of a cold junction, a cooling fin attached to each of said outer ends, a chimney surrounding said fins and generator, said fins being fastened to said chimney, a damper in said chimney, means for rotating said damper from outside said chimney, and a control element connected to said rotating means.

8. Apparatus in accordance with claim 7 said control element is a thermostatic device responsive to ambient temperature around said chimney and operatively connected to said means in the sense to automatically open said damper with increased ambient temperature, whereby the voltage output of said generator is regulated in a direct proportion to the ambient temperature.

9. A cooling system comprising a thermoelectric generator whose output voltage is directly proportional to ambient temperature, and a theromelectric cooler operatively and remotely connected to the output of said generator, said cooler having an exposed cold junction, and quick detachable means for mounting said cooler on an object to be cooled, with said cold junction in contact therewith.

10. A cooling system for a gaseous discharge lamp comprising a thermoelectric cooler having a cold junction and adjacent electrically separated ends constituting parts of a hot junction, a cooling fin attached to each of said ends, an electrical supply connection to each of said fins, said cold junction being exposed, means engaged with said fins for wrapping around a lamp to be cooled with said cold junction in contact with the envelope wall of the lamp, a thermoelectric generator with output leads operatively connectable to said supply connections of said cooler, and means connected to said generator for regulating the output voltage thereof in direct proportion to ambient temperature.

11. Apparatus in accordance with claim 10 including a gaseous discharge lamp to be cooled, wherein said wrapping means comprises a silicone rubber band stretched around said lamp and looped over the ends of said fins, and including a quantity of heat-conducting substance between said cold junction and the wall of said lamp.

References Cited by the Examiner

UNITED STATES PATENTS

| | | | |
|---|---|---|---|
| 2,932,753 | 4/60 | Arnott et al. | 313—42 |
| 3,018,430 | 1/62 | Pack | 310—4 |

GEORGE N. WESTBY, *Primary Examiner.*

ARTHUR GAUSS, DAVID J. GALVIN, *Examiners.*